United States Patent [19]

Smith, Jr.

[11] Patent Number: 4,642,904
[45] Date of Patent: Feb. 17, 1987

[54] ENERGY CONSERVING PROCESS FOR DRYING A CLAY SLURRY

[75] Inventor: James M. Smith, Jr., Macon, Ga.

[73] Assignee: Georgia Krolin Company, Inc., Union, N.J.

[21] Appl. No.: 761,643

[22] Filed: Aug. 1, 1985
(Under 37 CFR 1.47)

[51] Int. Cl.$^4$ ............................................... F26B 3/12
[52] U.S. Cl. ............................................ 34/9; 34/14; 34/35; 34/75; 34/86; 34/57 R
[58] Field of Search ................. 34/9, 14, 35, 75, 57 R, 34/86

[56] References Cited

U.S. PATENT DOCUMENTS

| | | | |
|---|---|---|---|
| 3,889,390 | 6/1975 | Klare | 34/75 |
| 4,044,820 | 8/1977 | Nobles | 34/86 |
| 4,247,991 | 2/1981 | Mehta | 34/86 |

Primary Examiner—Albert J. Makay
Assistant Examiner—David W. Westphal
Attorney, Agent, or Firm—William W. Habelt

[57] ABSTRACT

An aqueous clay slurry 7 is partially dewatered by filtration to remove a first portion of water therefrom which is collected as the filtrate 71. The partially dewatered clay slurry 9 is then contacted with a hot drying gas 25 in a spray dryer 20 to remove an additional water therefrom which is entrained as water vapor in the drying gas 27 exhausted from the spray dryer. The drying gas 27 exhausted from the spray dryer 20 is contacted in a cooling tower 40 with cooling liquid 59 to cause at least a portion of the water vapor evaporated from the aqueous slurry to condense. A first portion 43 of the condensate is passed in heat exchange relationship with the aqueous clay slurry 7 passing to the filter means 10 so as to preheat the clay slurry prior to filtration, a second portion 45 of the condensate is passed in heat exchange relationship with the partially dewatered clay slurry 9 passing from the filtration step so as to preheat the partially dewatered clay slurry prior to spray drying, and a third portion 47 of the condensate is passed in heat exchange relationship with ambient drying gas 21 so as to preheat the drying gas being supplied to the spray dryer 20. The cooled condensate streams 53, 55 and 57 are recycled to the cooling tower 20 to serve as cooling liquid 59 for contacting with the drying gas 27 exhausted from the spray dryer 20.

14 Claims, 1 Drawing Figure

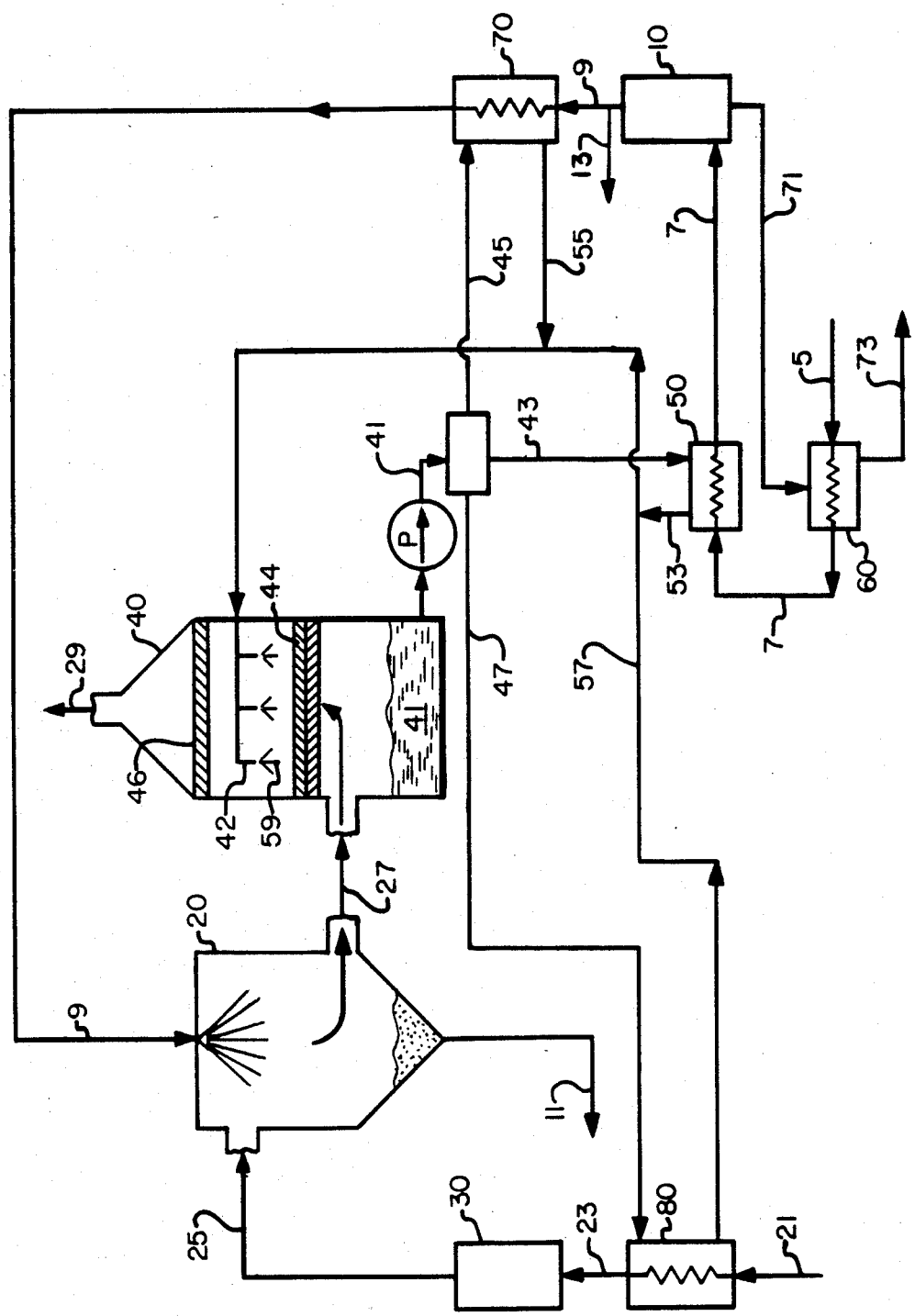

ENERGY CONSERVING PROCESS FOR DRYING A CLAY SLURRY

BACKGROUND OF THE INVENTION

The present invention relates generally to the processing of clay and, more particularly, to an improved method for concentrating a beneficiated aqueous kaolin clay slurry which includes evaporating water therefrom through spray drying wherein at least a portion of the energy expended in evaporating water from the slurry is recovered and used in the clay processing.

Kaolin clay has many known applications in industry, including use as a filler in papermaking, a coating for paper, and a pigment in paint. However, crude kaolin clay typically contains various impurities which cause discoloration. Additionally, crude kaolin is typically too abrasive for direct use in these products. Therefore, it is necessary to beneficiate the crude kaolin clay by various well-known commercial processes which increase the brightness of the kaolin by removing discoloration impurities and decrease the abrasiveness by reducing the particle size of the kaolin particles.

In general, such processes for beneficiating crude kaolin clay require that the clay be processed as a low solids slurry. Therefore, it is necessary to add substantial amounts of water to the dry crude kaolin clay to form a clay suspension or slurry having a low solids content, typically in the range of 15% to 40% by weight. However, for commercial applications, the beneficiated clay slurry must have a much higher solids content. Typically beneficiated kaolin clays are shipped commercially for use in paper making, paper coating and paint making as a high solids slurry having a solids content in the range of 65% to 75% by weight. Therefore, most of the water added to the dry kaolin clay must be removed in order to concentrate the clay solids.

To dewater a beneficiated clay slurry, the low-solids slurry is typically first passed to a vacuum or press type filter wherein a limited portion of the water is removed from the slurry. Typically, the filter cake from the filter would have a solids content of about 50% to 60% by weight. Thus, the slurry would still comprise about 40% to 50% water. Further dewatering on a vacuum or press type filter is impractical due to the fine particle size of the solids in the beneficiated clay slurry. Typically, to further dewater the beneficiated clay slurry to a commercially acceptable solids content, at least a portion of the partially dewatered slurry is passed through a spray dryer or other direct contact-type evaporator such as a gas-fired kiln, wherein the clay slurry is contacted with a drying medium having a temperature of 1000° F. or more, such as hot air or hot flue gas typically generated from the combustion of natural gas. Although all of the clay slurry may be passed through the spray dryer for drying, it is customary to pass only a portion of the clay slurry through the spray dryer and then to re-mix the thoroughly dried clay slurry from the spray dryer with the remaining portion of partially dewatered slurry in a high shear mixer to produce a product clay slurry having a solids content of 65% to 75%.

A problem associated with concentrating clay slurries in spray dryers is that spray drying is a relatively inefficient process and considerable energy must be consumed in the spray drying process in order to evaporate the water in the clay slurry. In prior art spray drying systems used for concentrating clay slurries, the water vapor evaporated from the clay slurry in the drying process is typically vented to the atmosphere in the exhaust gas from the dryer. Thus, the energy expended in evaporating the water vapor is wasted.

It is therefore a general object of the present invention to provide an improved method for concentrating a beneficiated aqueous clay slurry via spray drying in an energy efficient manner wherein the energy expended in evaporating water from the clay slurry is at least in part recovered and used in the clay slurry processing.

SUMMARY OF THE INVENTION

The solids content of an aqueous clay slurry is concentrated by evaporating water therefrom by passing the aqueous clay slurry in contact with a hot drying gas in an evaporative dryer. Energy, normally wasted when the water vapor evaporated from the clay during the drying is vented to the atmosphere with the exhaust gas from the dryer, is recovered by condensing at least a portion of the water vapor in the exhaust gas prior to venting the exhaust gas to the atmosphere. The condensate from the cooling tower is used as a heat source in the process in at least one of three ways to recover at least a portion of the heat expended in evaporating the water from the aqueous clay slurry in the evaporative dryer.

In the process of the present invention, the aqueous clay slurry is partially dewatered by filtration to remove a first portion of water therefrom which is collected as the filtrate. At least a portion of the partially dewatered clay slurry is then contacted with a hot drying gas in an evaporative dryer to remove an additional portion of water therefrom which is entrained as water vapor in the drying gas exhausted from the dryer. Prior to venting to the atmosphere, the drying gas exhausted from the dryer is then passed through a cooling tower in heat exchange relationship with a cooling liquid to cause at least a portion of the water vapor evaporated from the aqueous clay slurry to condense.

In the preferred closed-loop process of the present invention, the water vapor is condensed in the cooling tower by contacting the drying gas exhausted from the dryer with an aqueous cooling liquid. the condensate is collected and split into three portions. A first portion of the condensate is passed in heat exchange relationship with the aqueous clay slurry passing to the filtration step so as to preheat the clay slurry prior to filtration, a second portion of the condensate is passed in heat exchange relationship with the partially dewatered clay slurry passing from the filtration step so as to preheat the partially dewatered clay slurry prior to evaporative drying, and a third portion of the condensate is passed in heat exchange relationship with ambient drying gas so as to preheat the drying gas being supplied to the spray dryer. The cooled condensate is then recycled to the cooling tower to serve as cooling liquid for contacting with the drying gas exhausted from the evaporative dryer.

Additionally, it is preferred that at least a portion of the heat in the filtrate from the filtration step be recovered by passing the filtrate in heat exchange relationship with ambient aqueous clay slurry from the beneficiation process to preheat the aqueous clay slurry prior to concentrating the solids therein.

BRIEF DESCRIPTION OF THE DRAWING

The sole FIGURE of drawing is a schematic view of a preferred embodiment of the process of the present invention using a closed-loop heat recovery system.

DESCRIPTION OF THE PREFERRED EMBODIMENT

In order to be useful for paper filling, paper coating, paint making and other industrial purposes, naturally occurring kaolin crude clays must generally be processed to upgrade the clay in brightness and to reduce abrasiveness of the clay. In conventional processing for producing beneficiating kaolin clay, the crude kaolin clay is first blunged in water with a dispersing agent to form a clay-in-water suspension or slurry. After degritting and fractionation on a centrifuge to recover a desired particle size fraction, the fine particle fraction is typically diluted with water of 15% to 40% by weight solids content. This suspension is then typically treated with a bleaching compound containing a reducing agent, such as the dithionite ion, to reduce ferric ions in the clay to the ferrous state. After allowing the clay fraction to react with the reducing agent for a period of time, the clay fraction is then filtered, rinsed and then dried to concentrate the solids content of the clay for shipment. For most commercial purposes, the clay slurry is shipped at a solids content of at least 65% by weight, and typically in the range of about 70% to about 75% solids by weight. However, in some instances, the beneficiated clay is shipped as a substantially dry powder having a water content of less than about 1% by weight.

The process of the present invention, as illustrated in the preferred embodiment utilizing a closed-loop heat recovery cycle, provides an improved process for concentrating the solids in such a beneficiated clay slurry for shipment by evaporating water therefrom by passing the aqueous clay slurry first through a filter apparatus and then through an evaporative dryer. Energy expended in evaporating the water from the slurry in the evaporative dryer was typically wasted in the prior art when the water vapor evaporated from the clay during the evaporative drying process was vented to the atmosphere with the exhaust gas from the dryer. In the process of the present invention, this energy is recovered by condensing at least a portion of the water vapor in the dryer exhaust gas prior to venting the exhaust gas to the atmosphere. The recovered condensate is then utilized in the processing of the clay slurry whereby at least a portion of the energy expended in evaporating the water from the aqueous clay slurry is recovered.

Referring now to the drawing, the beneficiated low-solids aqueous kaolin slurry is passed to a filter apparatus 10, such as a rotary vacuum filter or a press filter, wherein the aqueous kaolin clay slurry is partially dewatered from a solids content typically in the range of 15% to 40% solids by weight to a solids content of about 50% to 60% by weight. Further dewatering on a rotary vacuum filter or press-type filter is impractical due to the fine particle size of the solids in the beneficiated clay slurry. Therefore, the partially dewatered kaolin clay slurry is passed to the evaporative dryer 20, which is shown in the drawing as a typical commercially available spray dryer, although other evaporative dryers of the type wherein the slurry to be dried is directly contacted with a hot drying gas, whereby water is evaporated from the slurry and entrained in the drying gas, may be used in carrying out the process of the present invention. In the spray dryer 20, a spray of the aqueous clay slurry 9 is contacted with a hot drying gas 25 whereby an additional portion of the water in the aqueous clay slurry 9 is removed therefrom by evaporation and entrained as water vapor in the drying gas 27 exhausted from the spray dryer 20. The product clay 11 collecting in the bottom of the spray dryer has been thoroughly dried to a water content typically of less than about 1% by weight. The thoroughly dry product clay 11 may be shipped as a dry powder if desired, but typically for most commercial uses it is remixed with a portion 13 of the 50% to 60% solids clay slurry from the filter apparatus 10 to produce a higher solids clay slurry for shipment, typically at a solids content in the range of 65% to 75% by weight.

In the process of the present invention, the drying gas exhaust 27 from the evaporative spray dryer 20 is passed in heat exchange relationship with a cooling liquid in a condensing cooling tower 40 to recover in the condensate at least a portion of the heat energy expended in evaporating the water from the aqueous clay slurry. In the preferred closed-loop embodiment, the drying gas 27 exhausted from the spray dryer 20 is contacted with a spray 59 of an aqueous cooling liquid which causes at least a portion of the water vapor entrained in the drying gas 27 exhausted from the spray dryer 20 to condense as the drying gas 27 is cooled upon contact with the cooling liquid 59. The water vapor condensing from the drying gas 27 in the cooling tower 40 collects in the bottom of the cooling tower 40 as condensate 41. The cooled drying gas 29 leaving the condensing cooling tower 40 is vented to the atmosphere.

It is to be understood that the cooling tower 40 may comprise any of a number of well known and commercially available condensing type cooling towers. In the embodiment shown in the drawing, the cooling tower 40 is a direct contact type condenser wherein a spray of aqueous cooling liquid 59 is directed into the gas stream through a plurality of spray nozzles 42 in countercurrent flow with the drying gas flowing upwardly through the cooling tower 40. Wetting surface means 44 are disposed beneath the spray nozzles 42 and are traversed by the gas flowing upwardly through the cooling tower 40. The wetting surface means 44 provides an increased surface over which the cooling liquid 59 will flow in draining to the bottom of the cooling tower 40 and come in intimate contact with the gas passing upwardly through the cooling tower 40 thereby ensuring efficient cooling of the gas. Demister means 46 are disposed above the spray nozzles 42 to remove excess moisture from the gas prior to venting the gas 29 to the atmosphere.

In accordance with the present invention, the condensate 41 collecting in the cooling tower 40 is utilized for a source of heat in the process for concentrating the solids in the aqueous clay slurry whereby at least a portion of the heat energy expended in evaporating the water from the aqueous clay slurry in the spray dryer 20 is recovered. More specifically, the condensate 41 is pumped from the cooling tower 40 in heat exchange relationship with one or more clay slips within the process so as to preheat those clay slips, or in heat exchange relationship with the drying gas being supplied to the spray dryer 20 so as to assist in the heating of the drying gas. Having been cooled during such heat exchange, the cooled condensate 41 is then passed back to the cooling tower 40 and injected through spray nozzles 42 to form at least a substantial portion of the cooling liquid spray 59 contacted with the drying gas passing through the cooling tower 40. The aqueous cooling liquid will be comprised substantially of water and for the most part water condensed from the exhaust gas, i.e. the recycled condensate 41. However, the aqueous cooling liquid may include other constituents in addition to water. For instance, if desired, an agent such as ethylene glycol or propylene glycol may be added to the water to enhance the condensation process. Additionally, a pH modifier may be added as desired to the water to adjust the pH of the condensate 41 in order to control corrosion in the heat exchangers through which the condensate will pass in the heat recovery process.

In the process of the present invention, three particular uses are contemplated for the condensate 41. These include preheating the aqueous clay slurry 7 prior to filtration in the filter means 10, preheating the partially dewatered aqueous clay slurry 9 from the filtration step prior to evaporative drying in the spray dryer 20, and preheating an ambient stream 21 of drying gas prior to passing the drying gas through the main heating means 30 and thence to the spray dryer 20. In the preferred closed-loop embodiment of the process of the present invention shown in the drawing, the condensate 41 pumped from the cooled tower 40 is split into three portions, 43, 45 and 47. The first portion 43 of the condensate 41 from the cooling tower 40 is passed through heat exchanger 50 in indirect heat exchange relationship with the aqueous clay slurry 7 passing to the filter means 10 so as to preheat the aqueous clay slurry 7 prior to filtration and to cool the first portion 43 of the condensate 41 thereby recovering at least a portion of the energy expended in evaporating water from the aqueous clay slurry in the spray dryer 20. In this manner, the clay slurry being fed to the filter means 10 is preheated preferably to a temperature of about 130° F. prior to filtration. In the process of passing in heat exchange relationship with the aqueous clay slurry 7 in the heat exchanger 50, the first portion 43 of the condensate 41 is cooled to a temperature in the range of 110° F. to 120° F. The cooled condensate 53 is then collected and recycled back to the cooling tower 40 to form a portion of the cooling water sprayed through spray nozzles 42 into the gas stream 27 passing through the cooling tower 40.

The second portion 45 of the condensate 41 from the cooling tower 40 is passed through heat exchanger 70 in indirect heat exchange relationship with the partially dewatered kaolin clay slurry 9 passing from the filtration step carried out in the filter means 10. In this manner, the partially dewatered kaolin clay slurry 9 to be sprayed into the spray dryer 20 to contact the hot drying gas therein is preferably preheated to a temperature in the range of about 140° F. to 150° F. This preheating of the slurry feed to the spray dryer 20 reduces the amount of heat energy which must be input to the clay slurry within the spray dryer 20 in order to bring the clay slurry up in temperature to the point where evaporation of the water therein will readily occur within the spray dryer 20. Thus, a lower quantity of hot drying gas can be input to the spray dryer 20 and still effectively evaporate water from the clay slurry 9. The second portion 45 of the condensate 41 from the spray tower 40 is cooled in passing through the heat exchanger 70 in heat exchange relationship with the partially dewatered clay slurry 9 and the cooled condensate 55, preferably to a temperature in the range of 110° F. to 120° F. and recirculated to the cooling tower 40 and injected into the exhaust gas through spray nozzles 42 to form a portion of the spray 59 of cooling liquid contacted with the exhaust gas from the spray dryer 20 within the cooling tower 40.

The third portion 47 of the condensate 41 pumped from the cooling tower 40 is passed through heat exchanger 80 in indirect heat exchange relationship with a stream of ambient air to preheat the ambient air. The preheated air 23, preferably at a temperature of about 135° F. to about 145° F., is then passed to heating means 30, typically a direct-fired air heater, wherein the hot drying gases 25 to be supplied to the spray dryer 20 is generated. Generally, a fossil fuel, such as natural gas, is fired directly in the preheated air stream 23 to generate hot combustion products which form the hot drying gas 25. The hot drying gas 25 is produced in the heating means 30 and supplied to the spray dryer 20 at a temperature in the range of 1000° F. to 1200° F., and preferably about 1100° F. The third portion 47 of the condensate 41 is cooled in passing through heat exchanger 80, preferably to a temperature in the range of 110° F. to 120° F. and the cooled condensate 57 is recycled back to the cooling tower 40 and injected into the exhaust gas 27 from the spray dryer 20 through spray nozzles 42 to form a portion of the spray 59 of cooling liquid.

In the preferred embodiment of the process of the present invention shown in the drawing, further heat is recovered by passing the filtrate 71 removed from the aqueous clay slurry 7 as it passes through the filter means 10 in heat exchange relationship with the ambient aqueous clay slurry 5 being passed to the heat exchange means 50. The filtrate 71 will typically have a temperature in the range of 100° F. to 115° F. and is passed through heat exchanger 60 to pass in indirect heat exchange relationship with the ambient aqueous clay 50 which has a temperature ranging from as low as 50° F. to as high as 100° F. depending upon the season of the year. The ambient aqueous clay slurry 5 would be colder in the winter months and warmer in the summer months. By passing the aqueous clay slurry 5 in heat exchange relationship with the filtrate 71, a more uniform temperature is obtained year-round for the aqueous clay slurry 7 being passed to the first heat exchange means 50 in heat exchange relationship with the first portion 43 of the condensate 41 and then onto the filter means 10. The cooled filtrate 73 from the heat exchanger 60 is then passed to disposal and handled in a conventional manner.

It is to be understood that the process of the present invention may be carried out without splitting the condensate 41 from the cooled tower 40 into three separate streams as shown in the preferred embodiment of the present invention illustrated in the drawing. Depending on the particular circumstances of any given process, it may be desirable to split the condensate 41 into only two streams and to use those two streams to perform only two of the preheat functions discussed hereinbefore, or to leave the condensate stream as a whole and perform only one of those preheat functions, or even to use a single stream of condensate 41 to perform two or more of the heat exchange functions in series. The particular embodiment chosen for any application will depend upon the particular economies of the process in question.

Furthermore, it is contemplated that even in the preferred closed-loop three stream embodiment of the process of the present invention illustrated in the drawing, that the distribution of the condensate 41 between the three streams 43, 45 and 47 will vary from one application to another with the distribution of the three streams by no means constrained to be an equal distribution thereamongst. In fact, it is contemplated that in most applications the stream 45 used to preheat the partially dewatered aqueous clay slurry passing from the filtration step to the evaporative dryer will constitute the greatest portion of the condensate as this appears to be the most efficient use of the heat contained in the condensate. The optimum number of streams into which the condensate 41 is to be split and the particular distribution amongst those streams will vary with the economics of each application of the process of the present invention.

I claim:

1. A process for concentrating solids in an aqueous clay slurry comprising:
   a. dewatering the aqueous clay slurry by filtration to remove a first portion of water therefrom and collecting the water removed from the aqueous clay slurry as the filtrate from said filtration step;
   b. contacting the partially dewatered aqueous clay slurry from said filtration step with a hot drying gas in an evaporative dryer whereby an additional portion of the water in the aqueous clay slurry is removed therefrom by evaporation and entrained as water vapor in the drying gas exhausted from the evaporative dryer;
   c. condensing at least a portion of the water vapor evaporated from the aqueous clay slurry and entrained in the drying gas exhausted from the evaporative dryer by passing the drying gas exhausted from the evaporative dryer in heat exchange relationship with a cooling liquid in a cooling tower whereby at least a portion of the water vapor evaporated from the aqueous clay slurry is condensed from the drying gas exhausted from the evaporative dryer and collected as the condensate from the cooling tower;
   d. passing at least a portion of the condensate from the cooling tower in heat exchange relationship with the aqueous clay slurry being processed to preheat the aqueous clay slurry prior to said filtration step thereby cooling the condensate and recovering at least a portion of the energy expended in evaporating the water from the aqueous clay slurry in the evaporative dryer;
   e. recycling the cooled condensate having passed in heat exchange relationship with the aqueous clay slurry passing to said filtration step to the cooling tower to form at least a portion of the spray of cooling liquid contacted with the drying gas exhausted from the evaporative dryer; and
   f. passing the filtrate from said filtration step in heat exchange relationship with the aqueous clay slurry prior to passing the aqueous clay slurry in heat exchange relationship with the first portion of the condensate from the cooling tower.

2. A process as recited in claim 1 further comprising preheating the partially dewatered aqueous clay slurry from said filtration step prior to evaporative drying by passing a second portion of the condensate from the cooling tower in heat exchange relationship with the partially dewatered clay slurry passing from said filtration step to the evaporative dryer thereby cooling the condensate and recovering at least a portion of the energy expended in evaporating the water from the aqueous clay slurry in the evaporative dryer.

3. A process for concentrating solids in an aqueous clay slurry comprising:
   a. dewatering the aqueous clay slurry by filtration to remove a first portion of water therefrom and collecting the water removed from the aqueous clay slurry as the filtrate from said filtration step;
   b. contacting the partially dewatered aqueous clay slurry from said filtration step with a hot drying gas in an evaporative dryer whereby an additional portion of the water in the aqueous clay slurry is removed therefrom by evaporation and entrained as water vapor in the drying gas exhausted from the evaporative dryer;
   c. contacting the drying gas exhausted from the evaporative dryer with a spray of an aqueous cooling liquid in a cooling tower whereby at least a portion of the water vapor evaporated from the aqueous clay slurry is condensed from the drying gas exhausted from the evaporative dryer and collected with the cooling liquid as the condensate from the cooling tower;
   d. passing at least a portion of the condensate from the cooling tower in heat exchange relationship with the aqueous clay slurry being processed thereby cooling the condensate and recovering at least a portion of the energy expended in evaporating the water from the aqueous clay slurry in the evaporative dryer; and
   e. recycling the cooled condensate having passed in heat exchange relationship with the aqueous clay slurry to the cooling tower to form at least a portion of the spray of cooling liquid contacted with the drying gas exhausted from the evaporative dryer.

4. A process as recited in claim 3 wherein step (d) comprises: preheating the aqueous clay slurry prior to filtration by passing at least a portion of the condensate from the cooling tower in heat exchange relationship with the aqueous clay slurry passing to said filtration step thereby cooling the condensate and recovering at least a portion of the energy expended in evaporating the water from the aqueous clay slurry in the evaporative dryer.

5. A process as recited in claim 3 wherein step (d) comprises preheating the partially dewatered aqueous clay slurry from said filtration step prior to evaporative drying by passing at least a portion of the condensate from the cooling tower in heat exchange relationship with the partially dewatered clay slurry passing from said filtration step to the evaporative dryer thereby cooling the condensate and recovering at least a portion of the energy expended in evaporating the water from the aqueous clay slurry in the evaporative dryer.

6. A process for concentrating solids in an aqueous clay slurry comprising:
   a. dewatering the aqueous clay slurry by filtration to remove a first portion of water therefrom and collecting the water removed from the aqueous clay slurry as the filtrate from said filtration step;
   b. contacting the partially dewatered aqueous clay slurry from said filtration step with a hot drying gas in an evaporative dryer whereby an additional portion of the water in the aqueous clay slurry is removed therefrom by evaporation and entrained as water vapor in the drying gas exhausted from the evaporative dryer;

c. condensing at least a portion of the water vapor evaporated from the aqueous clay slurry and entrained in the drying gas exhausted from the evaporative dryer by passing the drying gas exhausted from the evaporative dryer in heat exchange relationship with a liquid in a cooling tower and collecting the condensed water vapor as the condensate from the cooling tower;

d. passing at least a portion of the condensate from the cooling tower in heat exchange relationship with an ambient stream of drying gas thereby preheating the stream of drying gas and recovering at least a portion of the energy expended in evaporating the water from the aqueous clay slurry in the evaporative dryer;

e. recycling the cooled condensate having passed in heat exchange relationship with the ambient stream least a portion of the cooling liquid passed in heat exchange relationship with the drying gas exhausted from the evaporative dryer;

f. further heating the preheated stream of drying gas to a temperature in the range of 1000° F. to 1200° F.; and g. conveying the stream of hot drying gas to the evaporative dryer to contact the aqueous clay slurry therein.

7. A process as recited in claim 6 wherein the step of condensing at least a portion of the water vapor entrained in the drying gas comprises contacting the drying gas exhausted from the evaporative dryer with a spray of an aqueous cooling liquid in the cooling tower and collecting the condensed water vapor with the cooling liquid as the condensate from the cooling tower.

8. A process for concentrating solids in an aqueous clay slurry comprising:

a. dewatering the aqueous clay slurry by filtration to remove a first portion of water therefrom and collecting the water removed from the aqueous clay slurry as the filtrate from said filtration step;

b. contacting the partially dewatered aqueous clay slurry from said filtration step with a hot drying gas in a evaporative dryer whereby an additional portion of the water in the aqueous clay slurry is removed therefrom by evaporation and entrained as water vapor in the drying gas exhausted from the evaporative dryer;

c. contacting the drying gas exhausted from the evaporative dryer with a spray of an aqueous cooling liquid in a cooling tower whereby at least a portion of the water vapor evaporated from the aqueous clay slurry is condensed from the drying gas exhausted from the evaporative dryer and collected with the cooling liquid as the condensate from the cooling tower;

d. passing a first portion of the condensate from the cooling tower in heat exchange relationship with the aqueous clay slurry passing to said filtration step so as to preheat the aqueous clay slurry prior to filtration and cool the first portion of the condensate thereby recovering at least a portion of the energy expended in evaporating water from the aqueous clay slurry in the evaporative dryer;

e. passing a second portion of the condensate from the cooling tower in heat exchange relationship with the partially dewatered clay slurry passing from said filtration step so as to preheat the partially dewatered clay slurry prior to evaporative drying and to cool the second portion of the condensate thereby recovering at least a portion of the energy expended in evaporating water from the aqueous clay slurry in the evaporative dryer;

f. passing a third portion of the condensate from the cooling tower in heat exchange relationship with the drying gas so as to partially heat the drying gas prior to contacting the partially dewatered clay slurry with the drying gas in the evaporative dryer and to cool the third portion of the condensate thereby recovering at least a portion of the energy expended in evaporating water from the aqueous clay slurry in the evaporative dryer;

g. recycling at least a portion of the cooled condensate to the cooling tower to form at least a portion of the aqueous cooling liquid spray contacted with the drying gas exhausted from the evaporative dryer; and h. passing the filtrate from said filtration step in heat exchange relationship with the aqueous clay slurry prior to passing the aqueous clay slurry in heat exchange relationship with the first portion of the condensate from the cooling tower.

9. A process as recited in claim 8 wherein the evaporative dryer comprises a spray dryer wherein the spray of the partially dewatered aqueous clay slurry is contacted with the hot drying gas.

10. A process as recited in claim 9 wherein a first portion of the partially dewatered clay slurry from said filtration step is spray dried to a water content less than about 1% by weight to provide a substantially dry clay product and said dry clay product is mixed with a second portion of the partially dewatered clay slurry from said filtration step to produce a clay slurry having a solids content of at least 65% by weight.

11. A process as recited in claim 10 wherein the aqueous clay slurry is partially dewatered in said filtration step from less than 40% solids by weight to 50% to 60% solids by weight.

12. A process as recited in claim 8 wherein the aqueous clay slurry is heated prior to said filtration step to a temperature of about 130° F. by passing in heat exchange relationship with the first portion of the condensate from the cooling tower.

13. A process as recited in claim 8 wherein the partially dewatered clay slurry from said filtration step is heated prior to evaporative drying to a temperature in the range of about 135° F. to about 145° F. by passing in heat exchange relationship with the second portion of the condensate from the cooling tower.

14. A process as recited in claim 8 wherein the cooled first portion of the condensate, the cooled second portion of the condensate, and the cooled third portion of the condensate are each recyled to the cooling tower at a temperature in the range of 110° F. to 120° F.

* * * * *

UNITED STATES PATENT AND TRADEMARK OFFICE
CERTIFICATE OF CORRECTION

PATENT NO. : 4,642,904
DATED : February 17, 1987
INVENTOR(S) : James M. Smith, Jr.

It is certified that error appears in the above—identified patent and that said Letters Patent is hereby corrected as shown below:

Column 9, lines 17 and 18, Part e of Claim 6, insert after "stream" in line 17 and before "least" in line 18, the following:

--of drying gas to the cooling tower to form at--.

Signed and Sealed this

Twelfth Day of January, 1988

Attest:

DONALD J. QUIGG

Attesting Officer

Commissioner of Patents and Trademarks